Dec. 1, 1964

J. C. COOKSEY ETAL

3,159,734

AUTOMATIC WELDING TOOL FOR FORMING ANNULAR WELDS

Filed Nov. 29, 1957

INVENTORS
JOHN C. COOKSEY,
EDWARD W. ROWLANDS, Jr.,
RAYMOND GARDNER, Jr.

BY *Frease & Bishop*

ATTORNEYS

Dec. 1, 1964  J. C. COOKSEY ETAL  3,159,734
AUTOMATIC WELDING TOOL FOR FORMING ANNULAR WELDS
Filed Nov. 29, 1957  5 Sheets-Sheet 2

INVENTORS
JOHN C. COOKSEY,
EDWARD W. ROWLANDS, Jr.,
RAYMOND GARDNER, Jr.

BY *Frease & Bishop*

ATTORNEYS

INVENTORS
JOHN C. COOKSEY,
EDWARD W. ROWLANDS, Jr.
RAYMOND GARDNER, Jr.
BY
Frease & Bishop
ATTORNEYS

United States Patent Office 3,159,734
Patented Dec. 1, 1964

3,159,734
AUTOMATIC WELDING TOOL FOR FORMING ANNULAR WELDS
John C. Cooksey, Millersburg, and Edward W. Rowlands, Jr., and Raymond Gardner, Jr., Massillon, Ohio, assignors, by mesne assignments, to Baldwin-Lima-Hamilton Corporation, Philadelphia, Pa., a corporation of Pennsylvania
Filed Nov. 29, 1957, Ser. No. 699,691
6 Claims. (Cl. 219—125)

The invention relates to a rotatable arc welding tool, and more particularly to an arc welding tool which may be used to perform automatic arc welding operations for forming annular welds of various types with a shielded rotatable welding tip.

The fabrication of heat exchangers involves the formation of many annular arc welds of various types for joining heat exchanger elements. These weld types may be annular seal welds formed in a flat plane or surface, annular trepan joint welds, and annular welds formed internally of small-diameter tubular parts. Such arc welds must be free of oxide formation in and around the welded joints, which, if present, may result in unsatisfactory welded joints.

Many problems are involved in forming sound and satisfactory arc welds of the indicated types. No welding tools have been available by which such annular arc welded joints can be made to provide sound and satisfactory welds utilizing an automatic arc welding operation.

A welding tool for performing such welding operations must include a rotatable welding tip. Power must be supplied to the tool to rotate the tip. Current must be supplied to the tip to establish and maintain the welding arc. An inert gas, such as argon, must be supplied to the welding zone to prevent oxide formation in and around the welded joint and on the surfaces of all metal parts heated in performing the welding operation. The welding tool parts adjacent the tip and other connected parts subjected to heating during the welding operation must be cooled, particularly if a rapid welding operation is to be carried out.

In addition to these requirements for a satisfactory tool to form any particular annular welded joint, radial adjustment for the welding tip must be provided for forming annular welded joints of different diameters. Further, provisions must be made for axial adjustment of the tip relative to a fixed plane, in which plane, or spaced from which plane, the annular welded joint may be required to be formed.

In addition to these requirements for forming annular welded joints of any one type but of various diameters and locations with reference to a fixed plane, a satisfactory tool must also provide for the formation of at least the three different indicated types of welds, that is, a surface or seal weld, a trepan weld, or an internal weld, and including diameter and depth adjustability for each type of weld.

In addition to the foregoing requirements, the tool must have provisions for centering the tool with respect to the circle or annulus in which the weld is to be formed so that the tool will be maintained centered throughout the welding operation. Furthermore, the tip, which may be a small-diameter tungsten electrode, should have as short an unsupported length as possible to prevent change of predetermined position with respect to the weld being formed incident to flexing or warpage which can be caused by heating or movement of the welding electrode tip in carrying out an automatic annular welding operation.

Another requirement for a satisfactory welding tool is that the inert gas, such as argon, supplied to shield the welding operation, should be supplied to the arc and heated surfaces with flow but without pressure or pressure differences on surfaces of the metal zones heated in carrying out the arc welding operation.

An additional requirement for a welding tool satisfying the indicated requirements is that it should be capable of operation by automatic welding equipment for programmed welding control so that similar successive welds can be formed to be uniformly the same.

Accordingly, it is a general object of the present invention to provide a new welding tool construction which satisfies all of the stated requirements and which may be used for forming the various types of annular welded joints indicated.

Also, it is an object of the present invention to provide a new welding tool construction having a shielded rotatable welding tip in which cooling means is supplied to parts adjacent the tip and connected thereto, and in which the welding tool is portable and has a power drive, a source of electric power, water cooling means, and an inert gas supply connected thereto.

Furthermore, it is an object of the present invention to provide a new welding tool construction having a welding head and a rotatable welding tip which is radially and axially adjustable to enable the formation of annular welds of various diameters and at various locations with respect to a stop member or reference plane.

Likewise, it is an object of the present invention to provide a new welding tool construction incorporating the indicated objectives and having interchangeable adapter heads selectively for forming inside welds, trepan welds and seal welds.

Furthermore, it is an object of the present invention to provide a new welding tool construction which incorporates centering means for the welding head to maintain the axis of rotation of the welding tip in performing an annular welding operation centered with respect to the center of the annulus or circle of the resultant weld to be formed.

Moreover, it is an object of the present invention to provide a new welding tool construction which includes a small-diameter welding tip electrode mounted with a minimum of unsupported length so that an exact predetermined path of travel of the tip may be maintained in performing an annular welding operation without variations resulting from movement or warpage incident to welding heating.

Also, it is an object of the present invention to provide a new welding tool construction in which the welding tip, welding arc, and parts of the work which are heated in carrying out an annular welding operation are shielded with a flow of an inert gas, such as argon, without pressure or differential pressure on different surfaces of the work.

Moreover, it is an object of the present invention to provide a new welding tool construction which is portable and which may be operated from automatic welding equipment for programmed welding control.

Furthermore, it is an object of the present invention to provide a new welding tool construction which is flexible and versatile in operation and use and which may be used to carry out a variety of welding operations of various sizes at various locations with respect to a workpiece reference plane.

Moreover, it is an object of the present invention to provide a new welding tool construction incorporating the described arrangements which may be built, adjusted and operated with ruggedness and simplicity to satisfy existing problems in the art.

Finally, it is an object of the present invention to provide a new welding tool construction which incorporates features heretofore lacking in the art, which satisfies an existing need, and which attains the many new results and advantages herein set forth.

These and other objects and advantages apparent to those skilled in the art from the following description and claims may be obtained, the stated results achieved, and the described difficulties overcome by the discoveries, apparatus, parts, combinations, subcombinations and elements which comprise the present invention, the nature of which is set forth in the following general statement, preferred embodiments of which—illustrative of the best modes in which applicant has contemplated applying the principles—are set forth in the following description, and which are distinctly and particularly pointed out and set forth in the appended claims forming part hereof.

The nature of the improvements in welding tool construction of the present invention may be stated in general terms as preferably including in a portable welding tool, a stationary housing, a welding tip, means mounting the welding tip for rotation in the housing so that the tip travels in a circular path, means for adjusting the diameter of the circular path described by the tip during travel, a stop member having an engaging surface adapted to be engaged with or supported on a plane workpiece surface, means for adjusting the relative location of the stop member engaging surface with respect to the plane of travel described by the tip during rotation, means for centering the tool with respect to the center of the annular weld to be formed; flexible cable or conduit means connected with the tool for supplying a rotary drive to the tip, for supplying electric current to the tip, for supplying an inert gas to the tip, and for cooling the tool and parts thereof adjacent the tip; there being an adapter head or holder provided for the tip, the tip holder comprising interchangeable members adapted for selectively carrying out trepan, seal and inside welding operations, and the welding tip being adjustable in the tip holder and having a minimum unsupported length projecting from the tip holder.

By way of example, preferred embodiments of the improved welding tool are illustrated in the accompanying drawings forming a part hereof wherein.

Similar numerals refer to similar parts throughout the various figures of the drawings.

One form of improved welding tool is generally indicated at 1 in FIGS. 1 to 10 and includes a stationary cylindrical housing member or case 2 in which a plurality of bearings 3 and 4 are mounted by a retainer ring 5 and a lock ring 6. The retainer ring 5 is assembled in place by screws 7 while the lock ring 6 is threaded into the housing member 2 and may be locked in adjusted position by a set screw 8.

A rotatable drive sleeve 9 is carried by the rotatable portions 3a and 4a of the bearings 3 and 4 and thus mounted for rotation within the housing 2. A worm ring gear 10 centrally surrounds the drive sleeve 9 and is preferably silver soldered thereto at 11 and is driven by a worm gear 12 journalled in a worm assembly box 13 to which a flexible drive cable 14 (FIG. 1) is connected. Access to the worm assembly box 13 may be had by removing the screws 15 in flange 15a of box 13. An insulating material sleeve member 16 is mounted within drive sleeve 9 and fixed for rotation with drive sleeve 9 by set screws 17.

A top L-shaped ring-like insulating block member 18 has a portion telescoped within bearing retainer ring 5, a brass spacer washer 19 preferably being interposed between the flange of member 18 and the retainer ring 5. A tubular preferably copper or copper alloy current-conducting spindle member 20 is mounted within insulating sleeve member 16 and locked thereto for rotary driving movement by pin 21 received in slot 22 in the upper end of insulating sleeve 16 so that the spindle member 20 rotates with the drive members 9 and 16.

A bearing ring 23 is preferably silver soldered at 24 to the drive sleeve spindle 20 adjacent the upper end of the spindle 20 forming a mounting abutment for retaining and sealing water jacket housing 26. Retainer ring 25 is threaded onto the lower end of spindle sleeve 20 and engages the lower end of insulating drive sleeve 16 to complete the assembly of the rotatable spindle 20 in the case 2.

A stationary annular water jacket housing 26 surrounds the upper end of rotatable spindle member 20 above the bearing ring 23 and is held in assembled position by the nut 27 threaded onto the upper end of spindle member 20. The water jacket housing 26 is provided with an annular cooling means inlet groove 28 (FIG. 4) and with an annular cooling means outlet groove 29 (FIG. 3), each groove surrounding the upper end portion of the tubular spindle member 20. A flexible conduit 30 is connected with the jacket housing 26 and communicates, with groove 28 through opening 31 for supplying cooling water to the tool; and a similar flexible conduit 32 (FIG. 1) is connected to the housing 26 and communicates with the outlet groove 29 through opening 33 for conveying cooling water or fluid away from the tool. If desired, one power connection 34 for supplying electric power to the tool for the arc may extend within the cooling water outlet conduit 32 in the usual manner to provide an electrical connection with the tool water jacket member 26. O-ring seals 35 and 36 are provided to form fluid-tight joints between the stationary water jacket housing 26 and the rotatable spindle 20 and bearing ring 23 connected thereto so as to prevent leakage of cooling fluid from the cooling system within the tool.

A series of preferably radial holes 37 are formed in the upper end of the spindle member 20 communicating between the cooling means inlet groove 28 and the interior of spindle member 20; and a similar series of radial holes 38 is also formed in the upper end of the spindle member 20 adjacent the holes 37, communicating between the cooling means outlet groove 29 and the interior of spindle member 20.

The threaded flanged upper end 39 of a baffle tube 40 is threaded into the upper end of spindle member 20 so that the flange 39 is located between holes 37 and 38, and so that the tube 40 extends downwardly within spindle member 20 with its lower open end 41 located within the spindle member 20 adjacent the lower end of the latter. A preferably nylon plug 42 is threaded into and closes the upper end of spindle member 20, the lower end 43 of plug 42 being located above holes 38. A nylon plug 44 is also threaded into the lower end of spindle member 20 with the upper end 45 of the plug spaced from the lower end 41 of tube 40.

A stationary inert gas, preferably argon, supply tube 46, extends axially of the tool 1 through plug members 42 and 44, the lower end 47 of argon supply tube 46 terminating at the lower face of plug 44. Preferably O-ring seals 48 and 49 are provided respectively in plugs 42 and 44 between the rotatable plug members and the stationary argon supply tube 46 to seal the joints therebetween against leakage of cooling fluid.

Thus, a tubular annular chamber 50 is provided within the spindle member 20 between the interior surface thereof and the outer surface of baffle tube 40. The upper end of chamber 50 communicates through holes 37 with the cooling inlet means groove 28, and the lower end of chamber 50 communicates with the lower open end 41 of tube 40. Another annular chamber 51 is formed within tube 40 between the interior of tube 40 and the exterior of argon supply tube 46. Chamber 51 communicates at its lower end with chamber 50 and at its upper end through holes 38 with cooling means outlet groove 29.

Figures 2, 7, 8, 9, 10:
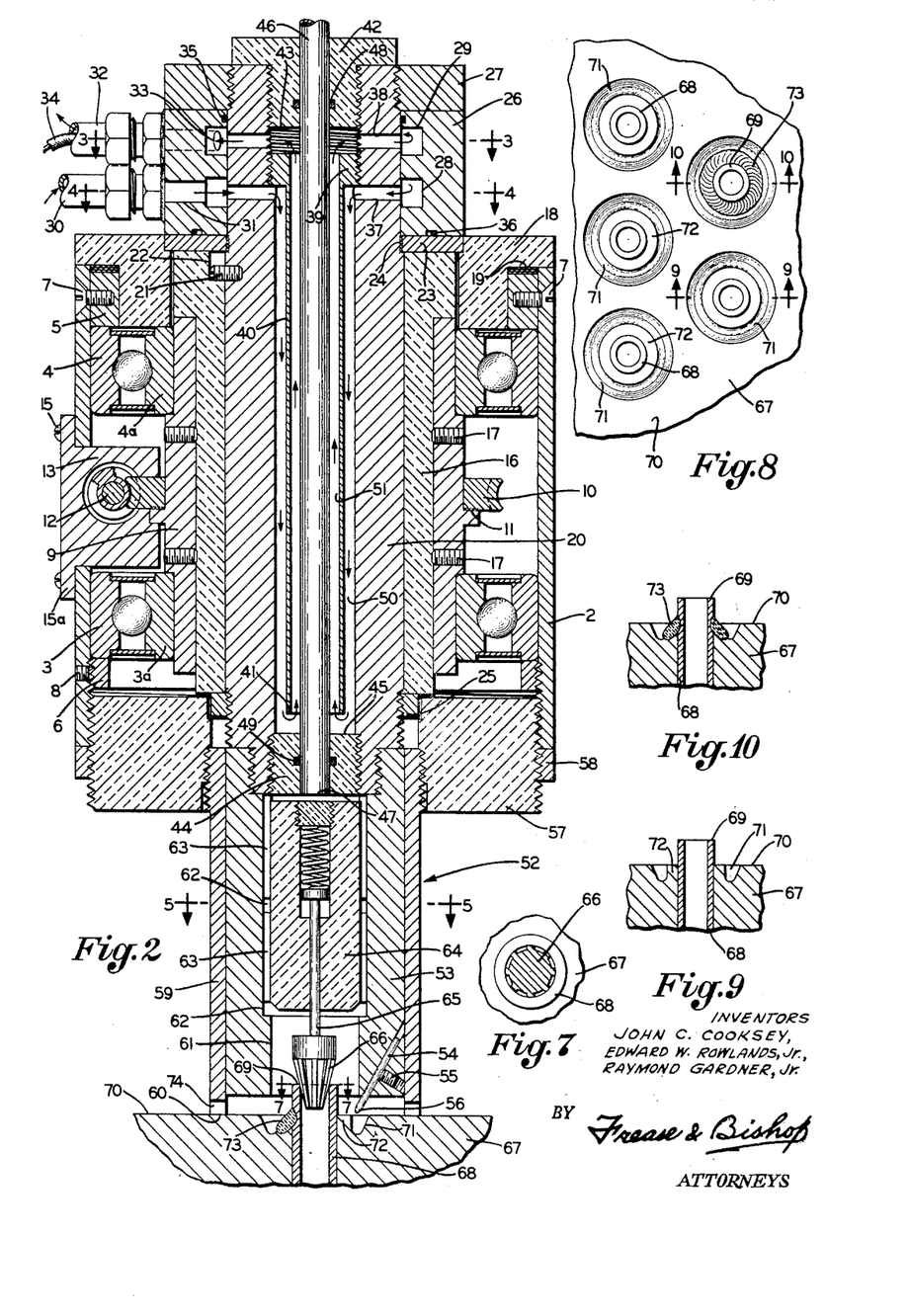
FIG. 2 is a longitudinal sectional view of the improved welding tool shown in FIG. 1 on a larger scale, the tool being equipped with an adapter head constructed to carry out a trepan welding operation.
FIG. 7 is an enlarged fragmentary section taken on the line 7—7, FIG. 2.
FIG. 8 is a fragmentary plan view of a workpiece on which annular trepan welds are to be formed, illustrating four locations to be welded and one location of a completed weld.
FIG. 9 is a section looking in the direction of the arrows 9—9, FIG. 8, illustrating a tube end to be welded to a plate member with a trepan weld prior to welding.
FIG. 10 is a view similar to FIG. 9 taken on the line 10—10, FIG. 8, illustrating the trepan weld after formation.
Figures 3, 4, 5, 6, 11:
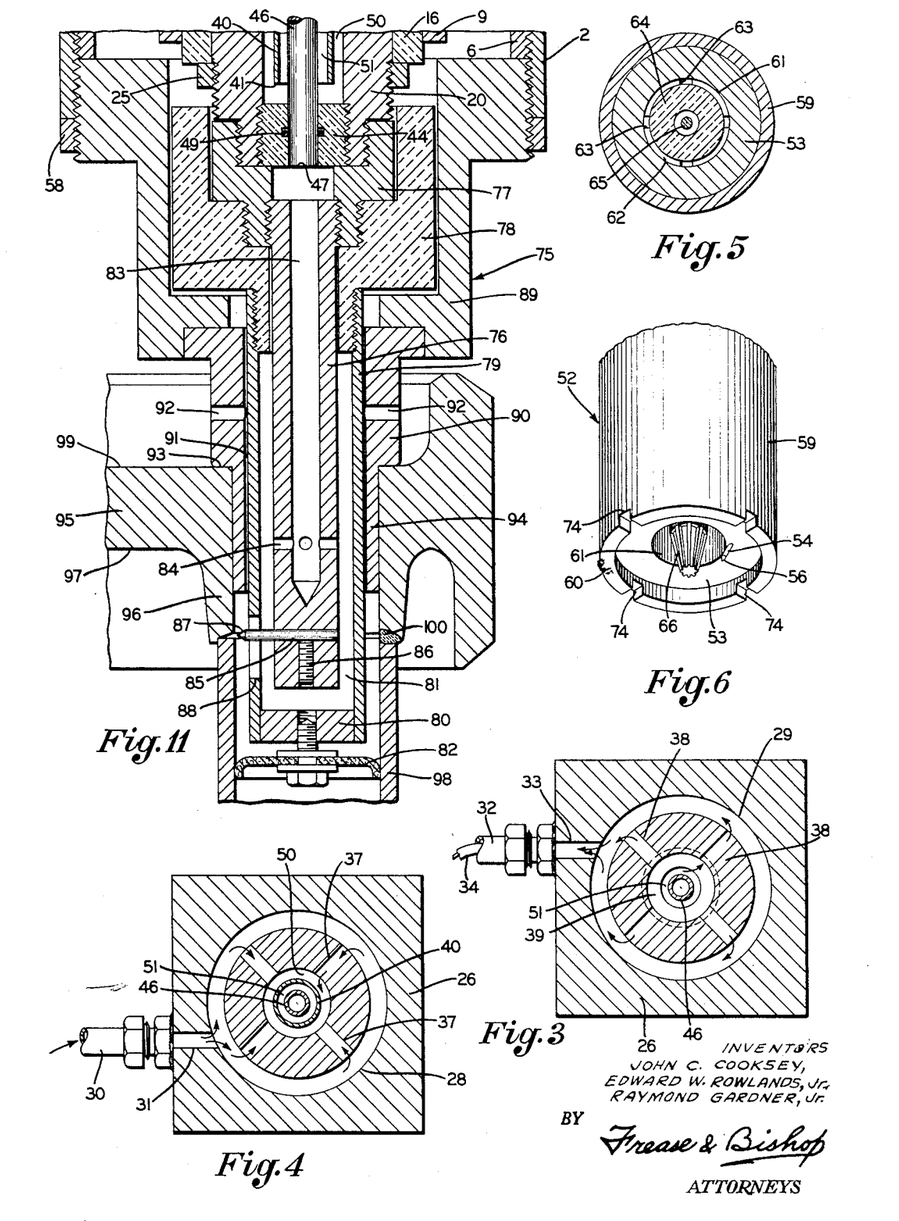
FIG. 3 is a cross-sectional view taken on the line 3—3, FIG. 2 illustrating the cooling means outlet for the tool.
FIG. 4 is a cross-sectional view taken on the line 4—4, FIG. 2 illustrating the cooling means inlet and the electrical power supply for the tool.
FIG. 5 is a transverse section through the adapter head taken on the line 5—5, FIG. 2.
FIG. 6 is a fragmentary perspective view looking upward toward the lower end of the adapter head of FIG. 2.
FIG. 11 is a view similar to FIG. 2 illustrating a fragmentary portion of the housing of the improved welding tool equipped with an adapter head for carrying out an internal annular welding operation.

A cooling fluid, such as water, supplied to the welding tool 1 through supply pipe 30 flows through opening 31 into inlet groove 28 and through opening 37, chamber 50, chamber 51, opening 38, outlet groove 29, opening 33 to outlet pipe 32 for cooling the tool during operation, and particularly the lower end thereof, as shown by the arrows in FIGS. 2, 3 and 4.

Figure 1:
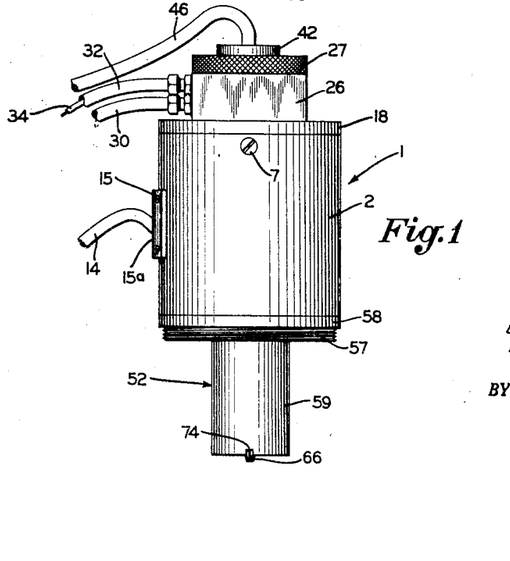
FIG. 1 is a side elevation of one form of improved welding tool.

The parts of the improved welding tool 1 thus far described form the basic service and supply unit for the improved tool, this service and supply unit being portable and having a rotary drive, electric current, an inert shielding gas, and cooling fluid supplied thereto through the flexible cables or conduits 14, 34, 46 and 30–32 as shown in FIG. 1. This basic service unit is used for carrying out any of the types of welding for which the tool is designed, by assembling a selected adapter head or electrode holder to the lower end thereof.

An adapter head generally indicated at 52 is illustrated in FIG. 2 which is constructed for carrying out a trepan welding operation. The trepan-weld adapter 52 includes a tubular electrode holder member 53 which is threaded onto the lower end of spindle member 20. A small-diameter welding, preferably tungsten, rod electrode member 54 is adjustably mounted by a set screw 55 in the lower end of holder 53 extending angularly downwardly inwardly of the lower end of holder 53 so that the tip 56 of electrode 54, with which the welding arc is formed, may be adjusted both radially inwardly and outwardly and axially upwardly and downwardly with respect to the longitudinal axis of rotation of the spindle 20 and therefore the axis about which the tip 56 rotates.

An insulating material ring 57 is adjustably threaded into the lower end of the tool housing member 2 and the ring 57 may be clamped in adjusted position by lock nut 58. A stop member sleeve 59 formed of heat and electrical insulating material is threaded into ring 57 and surrounds the electrode holder 53. The lower end 60 of stop member 59 (FIG. 6) is spaced below the lower end of holder member 53 as shown in FIGS. 2 and 6. Axial adjustment of ring 57 with respect to the housing member 2 of the welding tool 1 permits the lower end 60 of stop member 59 to be adjusted axially of the tool to accommodate axial adjustment of the location of the tip 56 of the welding electrode 54 so that an exact relation can be established and maintained between the lower end of stop member 59 and the tip 56.

The internal bore 61 of holder member 53 is preferably provided with a series of annular grooves 62 and longitudinal grooves 63. An insulating material plug 64 is pressed onto the grooved portion of the bore 61 of holder 53 with the upper end of the plug 64 being spaced below the lower end of the plug 45 in spindle member 20. The plug 64 carries a spring-pressed axially movable pilot and centering member 65 having a tapered grooved centering head 66 extending from the lower end thereof axially of the spindle member 20.

Argon shielding gas supplied through tube 46 flows out of the lower end of tube 47 from tube 46 to the space between plugs 45 and 64 and then flows down grooves 63 and around grooves 62 to the open bore 61 in the lower end of the holder 53 to supply inert shielding gas to the electrode tip 56.

The improved tool 1 with a trepan-weld adapter head 52 thereon is shown in FIG. 2 in a position for carrying out a trepan welding operation. A heat exchanger tube sheet is indicated at 67 through which tubes 68 extend and to which the tubes 68 are to be welded. The tubes 68 are assembled with the tube sheet 67 prior to welding, as illustrated in FIGS. 8 and 9, with the ends 69 of the tubes 68 projecting upwardly beyond the tube sheet surface 70. Trepan grooves 71 are formed in the surface 70 of the tube sheet 67 surrounding the ends 69 of the tubes 68, thereby providing tubular formations 72 surrounding the tube ends where the welded joints are to be formed.

The lower end 60 of the stop member 59 of the welding head 52 is engaged with the tube sheet surface 70 to properly locate the welding tip 56 axially with respect to the tubular formation 72; and the centering means 65 has its tapered head 66 engaged within the end of the tube 69 to axially center the welding head 52 with respect to the tube 69 and tubular trepan formation 72 of tube sheet 67. During operation of the tool 1 with the work electrically connected in the arc circuit, as the electrode tip 56 rotates about the axis of the tool, an annular trepan weld 73 is formed as illustrated in FIGS. 2, 8 and 10 joining the tube 68 to the tube sheet 67.

The interior of the tube 68 is preferably purged with a flow of argon prior to and during the welding operation from a separate supply of argon introduced through the tube 68 thus shielding the interior surface of tube 68 adjacent the welded area while heated to prevent oxidation. This argon purging gas flows out through the grooves of the grooved-tapered centering head 66 of centering means 65 and joins the argon supply to the welding tool within the bore 61 of electrode holder 53. The argon gas from both sources then flows below the end of holder member 53, meanwhile shielding the arc between electrode tip 56 and the work, and escapes to the atmosphere through notches 74 provided in the lower end 60 of stop member 59.

In this manner a flow of argon shielding gas is maintained around the arc and the welded area, and also around zones of metal heated during the welding operation without pressure and without differential pressure upon the inner and outer surfaces of the tube 69 being welded. Thus, distortion of the tube metal and welded area during welding is prevented which might otherwise occur if the welded zones are subjected to pressure or differential pressures while softened incident to the formation of the weld 73.

The adjustment provided for the electrode 54 and for stop member mounting ring 57 enables radial adjustment of the tip 56 of the electrode 54 to form annular welds of different diameters, and enables axial adjustment of the tip 56 relative to the end 60 of stop member 59 for forming welds in different locations with respect to the plane of the lower end of the stop member. The amount of radial adjustment of course for any one adapter 52 is dependent upon the angularity of the mounting of the electrode 54.

Where larger or smaller diameter annular trepan-type welds are to be formed than can be accommodated by the particular adapter head 52 dimensioned as illustrated in FIG. 2, another adapter head may be used having a larger or smaller diameter holder member 53 and a corresponding properly dimensioned stop member 59 and mounting ring 57. The scale of the device shown in FIG. 2 of the drawing is larger than one actual-size device which has been successfully used, which indicates the small-diameter character of annular trepan-type welds which may be formed to provide a satisfactory and efficient weld in using the improved welding tool of the present invention, FIG. 7 illustrating the tube diameter twice actual size.

Referring particularly to FIG. 2, the unsupported length of the electrode 54 where it projects beyond the end of holder 53 is quite small so that any distortion of the electrode incident to heating and cooling will be held to a minimum. Thus, when the tip 56 has once been adjusted for any particular weld or series of welds, it will maintain substantially an exact orbit of travel during rotation of the spindle member 20 in performing an annular welding operation to produce a uniform weld.

Referring to FIG. 11, an adapter head is generally indicated at 75 therein constructed for carrying out an internal welding operation. The adapter head 75 is connected to the basic service unit previously described which is supplied through flexible cables or conduits 14, 34, 46 and 30–32 as shown in FIG. 1 with a rotary drive, electric power, shielding gas and cooling fluid.

The internal-weld adapter 75 includes a tubular electrode holder member 76 which is threaded into a coupling member 77 which, in turn, is threaded onto the lower end of spindle member 20 so that the electrode holder 76 rotates with spindle member 20.

Another coupling member 78 is preferably threaded onto the lower end of coupling member 77 and rotates therewith onto which a purge tube 79 is threaded. The tube 79 is closed at its lower end at 80 so as to provide an enclosure for the holder member 76 with a chamber 81 formed therebetween. A flexible baffle 82 is preferably attached to the lower end 80 of purge tube 79. Argon shielding gas flowing from supply pipe 46 flows through coupling member 77 and into the central bore 83 of holder member 76 and passes out of holes 84 near the lower end of the bore 83 into chamber 81.

A welding electrode rod 85 is adjustably mounted preferably for radial movement in the lower end of holder member 76, the electrode 85 being held in any adjusted position by set screw 86 so that the tip 87 of the electrode 85 may be adjusted to and held in any predetermined radial adjusted position for describing an arc of predetermined diameter upon rotation of the welding tool spindle 20. Purge tube 79 is provided with an opening 88 through which the tip 87 of the electrode 85 extends.

The adapter 75 also includes a pilot adapter 89 adjustably threaded into the lower end of the tool housing member 2. Member 89 may be locked in any adjusted position by the lock nut 58. A pilot and centering member 90 is mounted on the lower end of the member 89 surrounding the purge tube 79 and spaced therefrom to form a passageway 91 therebetween. A series of holes 92 are formed in the upper end of the pilot member 90 above the stop shoulder 93 thereon, and a pilot or centering sleeve portion 94 of the pilot member 90 extends downwardly from the shoulder 93.

The improved welding tool of the present invention is illustrated in FIG. 11 positioned for carrying out an internal welding operation with the internal-weld adapter head 75. A heat exchanger tube sheet is indicated at 95 having a tubular sleeve 96 extending integrally from its lower surface 97 to which the end 98 of a tube is to be welded. The tube end 98 is assembled and held in proper position with respect to the tubular extension 96 as shown, and the pilot member 90 is inserted in the tube sheet opening with the stop shoulder 93 seated on the upper surface 99 of the tube sheet 95. Previously, the proper adjustments have been made of member 89 and electrode 85 to locate the electrode tip 87 at the proper position both radially and axially with respect to the annular internal weld to be formed. The pilot sleeve 94 centers the axis of rotation of the welding tip with respect to the longitudinal axis of the tube 98.

During operation of the tool as the electrode tip 87 rotates about the axis of the tool, an annular internal weld 100 is formed, as illustrated, joining the ends of the tube 98 and tubular formation 96, thereby joining the tube end to the tube sheet 95.

Upon insertion of the welding head 75 within the tube sheet opening, the purge baffle 82 seals off the interior of the tube 98 therebelow against the flow of an oxidizing atmosphere. Argon gas supplied to the purge chamber flows out of purge tube opening 88 shielding the arc and filling the space between the lower end of the purge tube 79 and the interior of tubular formation 96 and tube end 98, and then flows through passageway 91 to holes 92 where it escapes to the atmosphere.

Other diameters of annular internally welded joints 100 within tubes of different diameters beyond the range of adjustment of the tip 87 may be formed by providing a holder 76, a purge tube 79 and a pilot member 90 of different diameters. Even within the range of adjustment of the tip 87, a different diameter pilot member 90 will be used for each different diameter of tube sheet opening.

Figures 17, 18:
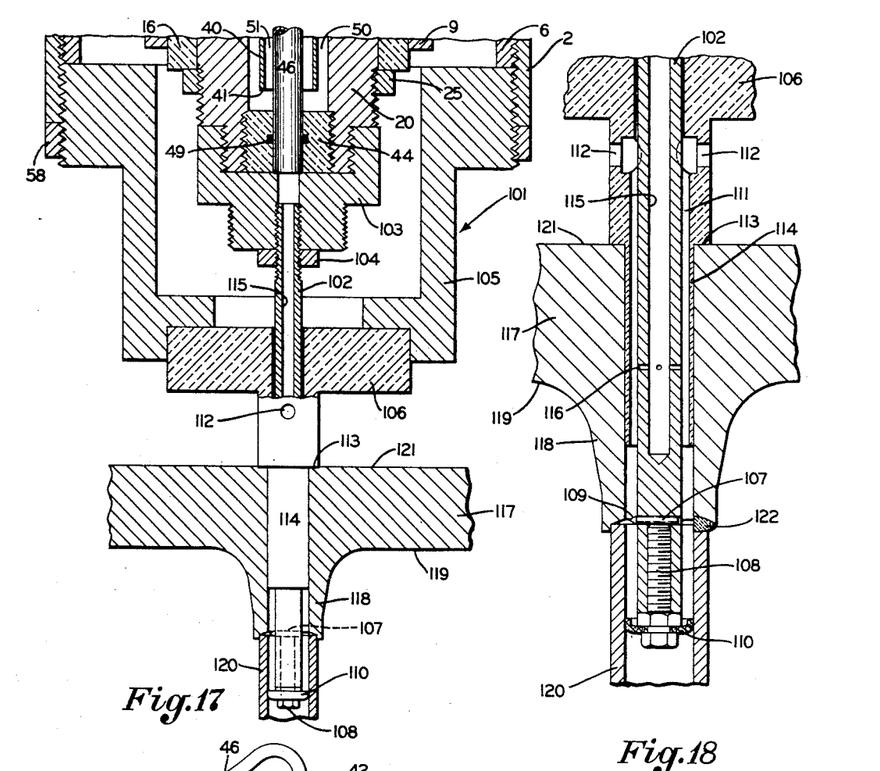
FIG. 17 is a view similar to FIGS. 2, 11, and 12 showing another form of adapter head for carrying out an inside welding operation within relatively small-diameter tubular workpiece members.
FIG. 18 is a fragmentary view on an enlarged scale of a portion of FIG. 17.

Another adapter head generally indicated at 101 is illustrated in FIGS. 17 and 18 constructed for carrying out an internal welding operation on extremely small-diameter workpieces, such as 0.338″ inside diameter tubes. The adapter 101 includes a tubular electrode holder member 102 threaded into a coupling member 103 which, in turn, is threaded onto the lower end of spindle member 20. A lock nut 104 may be provided for locking the holder 102 in any position of axial adjustment. The adapter 101 also includes a pilot adapter member 105 adjustably threaded in the lower end of tool case 2 and locked in adjusted position by lock nut 58. The pilot adapter 105 carries a pilot member 106. The internal construction of holder 102 and pilot member 106 are best shown in FIG. 18 on an enlarged scale.

A welding electrode rod 107 is adjustably mounted preferably for radial movement in the lower end of holder 102, the electrode 107 being held in any adjusted position by set screw 108 so that the tip 109 of the electrode 107 may be adjusted to and held in any predetermined radial adjusted position for describing an arc of predetermined diameter upon rotation of the welding tool spindle 20. A flexible baffle 110 is preferably attached to the lower end of the holder 102.

The pilot member 106 surrounds the holder 102 and is spaced therefrom to form a passageway 111 therebetween. A series of holes 112 are formed in the upper end of the pilot member 106 above the stop shoulder 113 thereon, and a pilot or centering sleeve portion 114 of the pilot member 106 extends downwardly from the shoulder 113.

Argon shielding gas flowing from supply pipe 46 flows through coupling member 103 and into the central bore 115 of holder member 102 and passes out of holes 116 near the lower end of the bore 115 into the passageway 111.

The tool illustrated in FIGS. 17 and 18 is positioned therein for carrying out an internal welding operation. A heat exchanger tube sheet is indicated at 117 having a tubular sleeve 118 extending integrally from its lower surface 119 to which the end of tube 120 is to be welded. The tube end 120 is assembled and held in proper position with respect to the tubular extension 118 as shown, and the pilot member sleeve 114 is inserted in the tube sheet opening with the stop shoulder 113 seated on the upper surface 121 of the tube sheet 117. Previously, the proper adjustments have been made of member 105 and electrode 107 to locate the electrode tip 109 at the proper position both radially and axially with respect to the annular internal weld to be formed. The pilot sleeve 114 centers the axis of rotation of the welding tip with respect to the longitudinal axis of the tube 120.

During operation of the tool with the adapter head 101, as the electrode tip 109 rotates about the axis of the tool, an annular internal weld 122 is formed, as illustrated in FIG. 18, joining the ends of the tube 120 and tubular formation 118, thereby joining the tube end to the tube sheet 117.

Upon insertion of the welding head 101 within the tube sheet opening, the purge baffle 110 seals off the interior of the tube 120 therebelow against the flow of an oxidizing atmosphere. Argon gas supplied to the holder bore 115 flows out of the openings 116 and into the chamber above the baffle member 110 between the holder 102 and the interior of the tubular formation 118 and the tube end 120 thereby shielding the arc. Flow of the argon escapes through passageway 111 and openings 112 to the atmosphere.

Different diameter tubes may be internally welded by adjustment of the tip 109 and by changing pilot member 106 to one having the necessary outer diameter for pilot sleeve portion 114. Different depths of the weld 122 in the tube sheet opening, or with respect to the tube sheet surface 121 may be accommodated by adjustment of the pilot adapter 105 or by changing the pilot member 106 to another having a location of its shoulder 113 at a different axial position.

Figures 12, 13, 14, 15, 16:
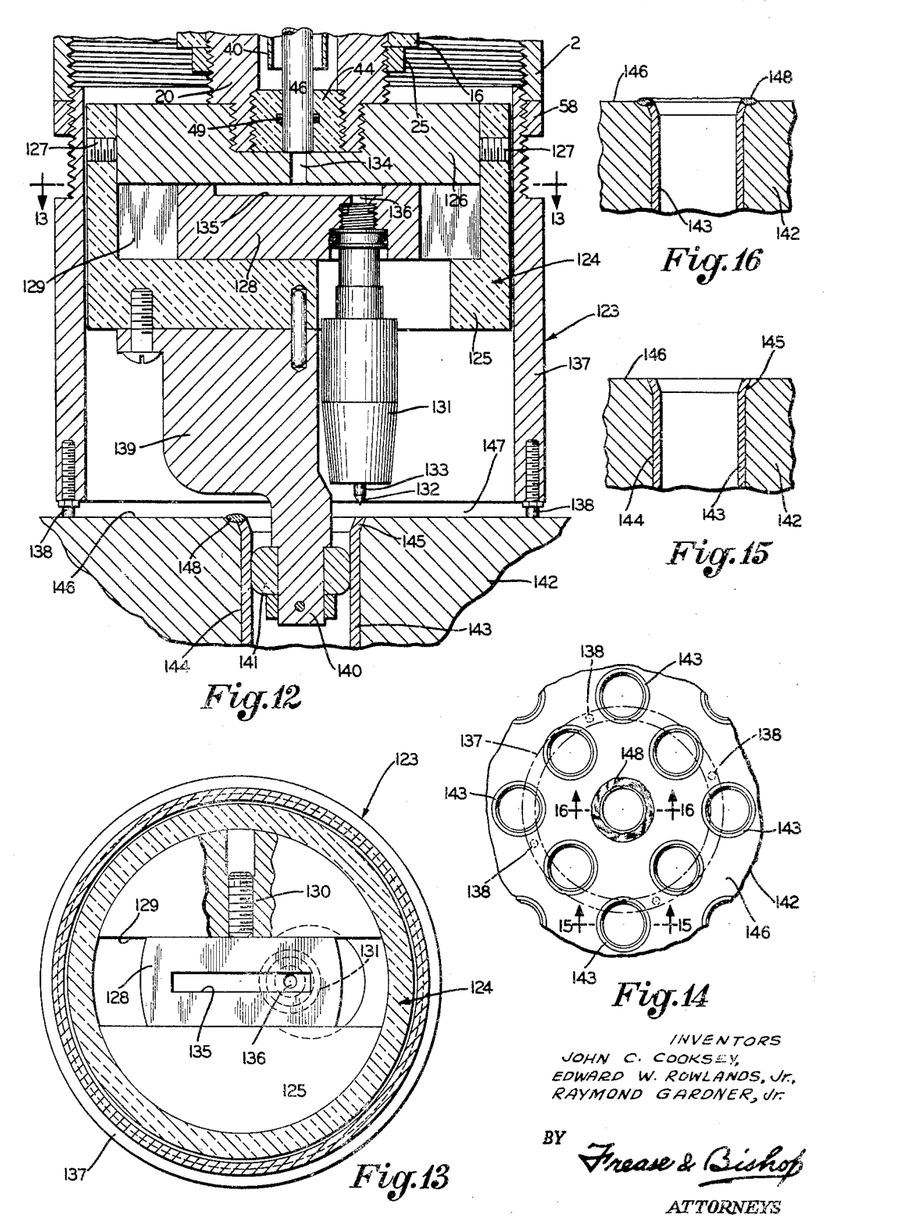
FIG. 12 is a view similar to FIGS. 2 and 11 illustrating another adapter head assembled to the housing of the improved welding tool for carrying out a seal welding operation.
FIG. 13 is a transverse sectional view looking in the direction of the arrows 13—13, FIG. 12.
FIG. 14 is a fragmentary view of a workpiece in which a number of seal welds are to be formed showing a number of locations of unwelded elements and one completed weld.
FIG. 15 is a sectional view looking in the direction of the arrows 15—15, FIG. 14 showing the parts to be welded by a seal weld prior to welding.
FIG. 16 is a view similar to FIG. 15 taken on the line 16—16, FIG. 14, illustrating the completed seal weld.

Another adapter head generally indicated at 123 is illustrated in FIGS. 12 and 13 constructed for carrying out a surface or seal welding operation. The adapter head 123 is connected to the same basic service unit previously described and includes an electrode holder member generally indicated at 124 having a housing member 125, a top plate 126 secured thereto by set screws 127, and an adjustable slide member 128 movable in transverse slide groove 129 and adapted to be locked in any position of adjustment by a set screw 130 (FIG. 13). The holder top member 126 is threaded onto the lower end of spindle member 20 so that the electrode holder 124 rotates with the spindle member 20.

A standard arc welding torch unit of usual construction indicated at 131 is mounted on adjustable slide 128 so that the location of the tip 132 of electrode 133 radial of the axis of rotation of the spindle 20 may be adjusted by movement of slide member 128. Argon gas supplied through supply tube 46 passes through aperture 134 in holder top member 126, then along groove 135 in slide member 128, then through opening 136 in slide member 128, through the interior of torch unit 131 to the electrode tip 132.

The adapter 123 also includes a stop sleeve 137 adjustably threaded into the lower end of the tool housing 2. Member 137 may be locked in any adjusted position by the lock nut 58. Member 137 also may be provided with a number of adjustable feet 138 at its lower open end for a purpose to be described.

A pilot and centering member 139 is mounted on the lower end of holder 124 having an axial extension 140 on which a pilot ring and purge seal member 141 is journalled so that the member 141 may be maintained stationary while the spindle 20 rotates carrying holder 124 and pilot adapter 139 for rotation therewith.

The operation of forming a surface or seal weld with the adapter head 123 is illustrated in FIG. 12. A heat exchanger tube sheet is indicated at 142 having a tube end 143 extending into a tube sheet opening 144 therein, with the open end of the tube 143 flared somewhat at 145 where the annular surface or seal weld is to be formed. The tube end 143 is assembled in the tube sheet as illustrated in FIG. 15. The pilot ring 141 is inserted within the tube end as illustrated in FIG. 12 with the adjustable feet 138 resting on the top surface 146 of the tube sheet 142. Previously, the necessary adjustment has been made of the location of electrode 133 radially with respect to the annular weld to be formed.

Also, adjustment of sleeve 137 on case 2 has been effected to locate electrode 133 axially at the proper position with respect to the annular weld to be formed. Since a space 147 is desired for the outflow of argon shielding gas supplied to the arc, between the lower end of stop member 137 and the tube sheet surface 146 in which the weld is to be formed, the adjustable feet 138 are provided, which also serve as abutment feet for resting on the tube sheet surface 146 at available locations where a series of closely spaced tube openings are located in the tube sheet as illustrated in FIG. 14.

During operation of the tool, as the electrode tip 133 rotates about the axis of the tool, with the axis of rotation centered with respect to the longitudinal axis of the tube 143 by member 141, an annular surface or seal weld 148 is formed, as illustrated, joining the end of the tube with the tube sheet at the surface of the tube sheet. The completed welded joint is illustrated in FIGS. 14 and 16.

Argon gas supplied to the torch member 131 shields the arc formed during the welding operation and escapes to the atmosphere through space 147. Other diameters of annularly welded seal joints 148 may be formed by adjustment of slide member 128, a pilot member 139 with a pilot ring 141 thereon of proper diameter being used for each different diameter of tube opening.

Figures 19, 20:
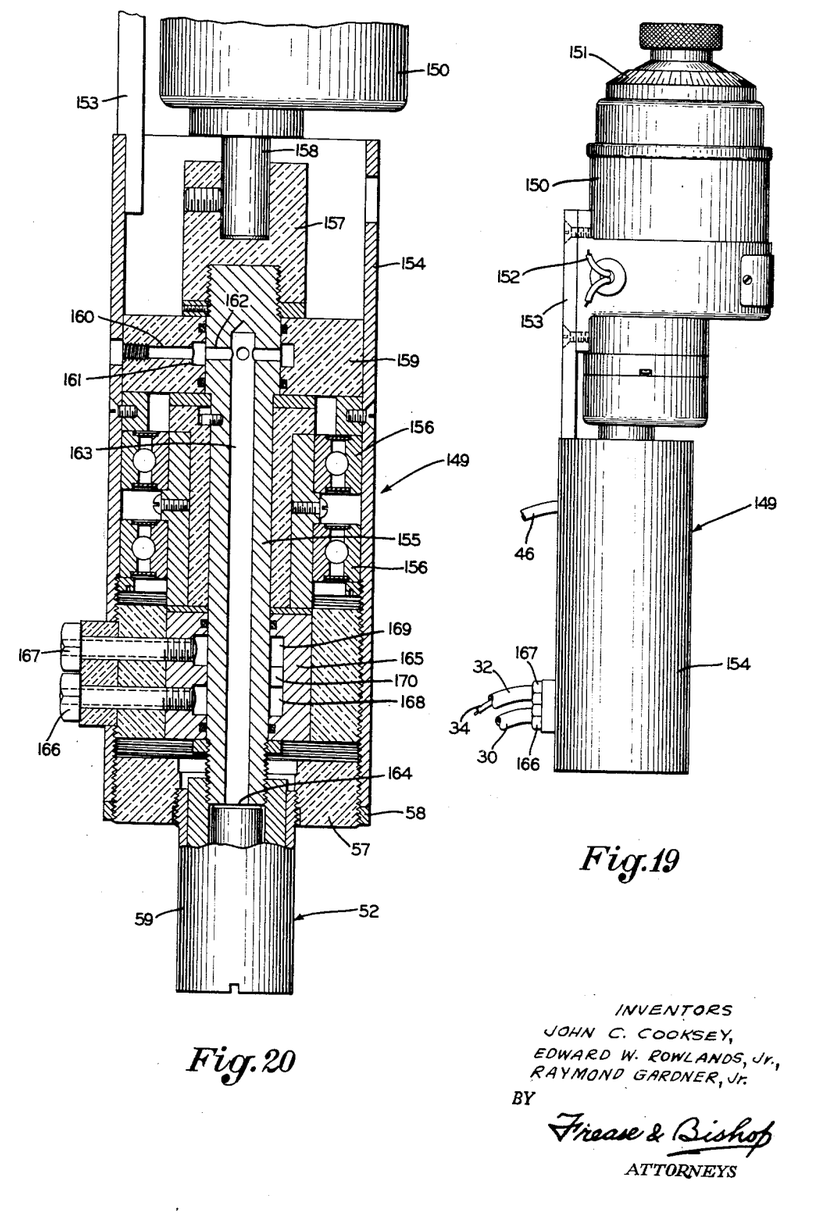
FIG. 19 is a view similar to FIG. 1 of a modified form of improved portable welding tool having a self-contained power drive.
FIG. 20 is a longitudinal section through portions of the improved tool shown in FIG. 19.

Another form of improved welding tool is generally indicated at 149 in FIGS. 19 and 20 driven by a self-contained motor 150 having a built-in speed control 151. The improved welding tool 149 is generally similar to the improved tool 1 excepting for the inclusion of a self-contained drive.

The motor 150 may be supplied with power through power leads 152, and the motor 150 is mounted on tool 149 by bracket 153. The welding tool 149 preferably includes an outer case 154 in which a spindle member 155 is journalled for rotation on bearings 156 in a manner somewhat similar to the construction of the tool 1.

A coupling 157 is connected to the upper end of spindle 155 and to the drive shaft 158 of motor 150 for rotating spindle 155 at desired speed.

A stationary shielding gas supply housing 159 is mounted within outer case 154 surrounding the upper end of rotatable spindle 155. The housing 159 has an opening 160 to which an argon gas supply line 46 may be connected (FIG. 19), and the opening 160 communicates with an annular groove 161. Radial holes 162 formed in the upper end of spindle 155 communicate with groove 161 and with the internal bore 163 of spindle 155. Thus argon gas may be supplied from supply 46 through opening 160, groove 161, openings 162 and internal bore 163 to the lower end 164 of spindle 155.

A welding head adapter such as the trepan-weld adapter 52 of FIG. 2 may be connected to the lower end of spindle 155, as generally indicated in FIG. 20, the stop member 59 of adapter 52 being mounted on ring 57 threaded into the lower end of outer case 154 and held in adjusted position by lock nut ring 58.

A cooling means supply housing 165 is also stationarily mounted within the outer case 154 surrounding the lower end of spindle member 155 having an inlet connection 166 and an outlet connection 167 which communicate, respectively, with inlet groove 168 and outlet groove 169 surrounding the lower end of spindle 155. A passageway 170 connects grooves 168 and 169.

A water inlet pipe 30 may be coupled to inlet member 166 (FIG. 19), and a cooling water outlet pipe 32 as well as a power lead 34 for the arc, may be connected to the outlet 167.

In this manner, the cooling means cools the lower end of spindle 155 immediately adjacent the connection of the welding head adapter 152 which is the portion of the basic service unit which would otherwise be hottest if not cooled. The self-contained tool 149 is normally intended for small work requiring only low power for operation so that cooling of the lower end only of the spindle 155 immediately adjacent the mounting of the welding head is sufficient to take away and dissipate heat conducted to the spindle 155 from the welding head 52.

Any of the improved tools with the basic service unit and any of the adapter heads illustrated in FIGS. 1 through 18 may be operated from automatic welding equipment for programmed welding control.

Such automatic welding equipment normally includes a control unit located at a work station with flexible drive, electric power, cooling water and argon supply cables or conduits extending from the control unit to the portable welding tool. The control unit typically includes mechanism for starting and stopping rotation of the tool spindle automatically for the desired time interval. The flow of cooling water to the welding tool is timed for the operation cycle of the tool as cooling water is only required during tool operation. Flow of cooling water when the tool is not operating is not desired so as to avoid condensation within the tool when not in use for welding.

The argon supply is also controlled so that argon is only supplied during the welding cycle. Finally, electric current supply to the welding head is automatically controlled to initiate the arc with high frequency voltage and to control the current for the desired rate of increase or decrease upon starting and finishing a welding operation. If desired, the timer controlling rotary motion during the welding cycle may include provisions for an initial dwell in order that a weld puddle of desired size may be established before the welding tip commences to move in a circular path for forming an annular weld.

In this manner and with typical automatic controls, a series of similar annular welds may be uniformly formed, each having uniform characteristics throughout any particular weld and successively welded joints having the same characteristics.

The self-contained tool illustrated in FIGS. 19 and 20 may be manually controlled by adjusting the speed of motor 150 and may have either automatic or manual control of the supply of argon, cooling water and power.

Accordingly, the improved welding tool for forming annular welds of the present invention provides for a rotary drive, weld-arc power supply, shielding gas and cooling means supply to a basic service unit with which removable heads may be connected having adjustable electrode tips for forming annular welds of various diameters and at various locations of either a trepan, inside or seal type; provides for centering the movement of the rotary electrode tip with respect to the annular weld to be formed; provides a short unsupported welding electrode length between the electrode mounting and its tip; provides for a shielding gas around the arc and the weld being formed and surfaces of workpieces welded, without differential pressures while maintaining gas flow; provides a portable tool which may be operated from automatic welding equipment for programmed welding control; provides a tool in which the coolant is supplied to tool parts subjected to heating very close to the electrode location; provides a tool having electrical and thermal insulated parts; and provides a tool which is extremely versatile in operation and use.

In the foregoing description certain terms have been used for brevity, clearness and understanding, but no unnecessary limitations are to be implied therefrom beyond the requirements of the prior art, because such terms are utilized for descriptive purposes herein and not for the purpose of limitation and are intended to be broadly construed.

Moreover, the description of the improvements is by way of example, and the scope of the invention is not limited to the exact details illustrated and described. For example, although the improved tool has been described in connection with forming various types of welds in the fabrication of a heat exchanger, the improved welding tool may be used to produce annular welds in the fabrication of many other products or assemblies.

Having now described the various features, discoveries and principles of the invention, the construction and operation of preferred forms of improved rotatable arc welding tool, and the advantageous, new and useful results obtained thereby; the new and useful discoveries, principles, apparatus, combinations, parts, subcombinations and elements, and mechanical equivalents apparent to those skilled in the art, are set forth in the appended claims.

We claim:

1. Rotatable arc welding tool construction including a housing, a rotatable spindle journalled in the housing, means for rotating the spindle, electrode holder means, mounting means selectively detachably mounting the electrode holder means on the spindle, said holder means extending coaxially from one end of the spindle and rotatable with the spindle, said mounting means selectively detachably mounting the electrode holder means on the spindle with the holder means being completely detachable from the spindle for selective removal and replacement by other electrode holder means with similar mounting means, a welding electrode mounted on said holder means having a welding tip, means for varying the distance between the electrode tip and the axis of rotation of the spindle, means for supplying arc shielding gas to the electrode tip, fluid cooling means operably connected to the spindle and extending to at least adjacent the holder means for circulating fluid to cool the spindle at least adjacent the mounting of said holder means thereon, and means for electrically connecting the electrode in an arc power circuit.

2. Rotatable arc welding tool construction including a housing, a rotatable spindle journalled in the housing, means for rotating the spindle, electrode holder means mounted on and rotatable with the spindle means, a welding electrode mounted on said holder means having a welding tip, means for supplying arc shielding gas to the electrode tip, fluid cooling means operably connected to the spindle and extending to at least adjacent the holder means for circulating fluid to cool the spindle at least adjacent the mounting of said holder means thereon, means for electrically connecting the electrode in an arc power circuit, stationary pilot means for positioning the axis of rotation of the spindle and thereby the axis of rotation of the electrode tip, stop means for positioning the axial location of the electrode tip along said axis of rotation, and means operably connecting the pilot and stop means to the spindle selectively detachable as a unit for selective removal of at least said pilot and stop means and replacement by means of different form.

3. Rotatable arc welding tool construction including a housing, a rotatable spindle journalled in the housing, means for rotating the spindle, electrode holder means operably connected with and extending axially from one end of the spindle and rotatable with the spindle, a welding electrode mounted on said holder means having a welding tip, means for supplying arc shielding gas to the electrode tip, fluid cooling means operably connected to the spindle and extending to at least adjacent the holder means for circulating fluid to cool the spindle at least adjacent the mounting of said holder means thereon, means for electrically connecting the electrode in an arc power circuit, pilot means for positioning the axis of rotation of the spindle and thereby the axis of rotation of the electrode tip, stop means for positioning the axial location of the electrode tip along said axis of rotation, and means operably connecting the holder and pilot and stop means to the spindle selectively detachable as a unit for selective removal and replacement by means of different form.

4. Rotatable arc welding tool construction including a housing, a rotatable spindle journalled in the housing, means for rotating the spindle, electrode holder means mounted on and rotatable with the spindle, a welding electrode mounted on said holder means having a welding tip, gas supply means extending axially through the spindle and holder means to the electrode tip for supplying arc shielding gas to the electrode tip, fluid cooling means extending axially through the spindle to at least adjacent the holder means for circulating fluid to cool the spindle at least adjacent the mounting of said holder means thereon, one of the gas supply and fluid cooling means being telescoped within the other of said means for at least a substantial part of the axial extent of said gas supply and fluid cooling means, and means for electrically connecting the electrode in an arc power circuit.

5. Rotatable arc welding tool construction as defined in claim 4 in which the gas supply and fluid cooling means extend co-axial with the center of rotation of the spindle and holder means.

6. Rotatable arc welding tool construction for insertion through openings formed in surfaces of tube sheets and the like and the forming of welds inwardly of said openings including a housing, a rotatable spindle journalled in the housing, means for rotating the spindle, electrode holder means mounted on and rotatable with the spindle, a welding electrode mounted on said holder means having a welding tip, the holder means being insertable through the tube sheet opening positioning the electrode tip inwardly of said tube sheet opening, means for supplying arc shielding gas to the electrode tip, fluid cooling means operably connected to the spindle and extending to at least adjacent the holder means for circulating fluid to cool the spindle at least adjacent the mounting of said holder means thereon, means for electrically connecting the electrode in an arc power circuit, pilot means operably connected to and stationary relative to the holder means engageable through the tube sheet opening when the holder means is inserted through said opening for positioning the axis of rotation of the spindle and holder means and thereby the axis of rotation of the electrode tip, and stop means operably connected to and stationary relative to the holder means engageable with the tube sheet when said holder means is inserted through the tube sheet opening for positioning the axial location of the electrode tip inwardly of said tube sheet opening.

References Cited in the file of this patent

UNITED STATES PATENTS

| | | |
|---|---|---|
| 1,128,116 | Dralle | Feb. 9, 1915 |
| 1,508,713 | Noble | Sept. 16, 1929 |
| 1,949,251 | Gilbert | Feb. 27, 1934 |